United States Patent [19]
Garbutt et al.

[11] Patent Number: 5,409,616
[45] Date of Patent: Apr. 25, 1995

[54] METHOD AND APPARATUS TO RESTORE GREY WATER

[75] Inventors: Cornelius D. Garbutt, St. Augustine; Douglas A. Moxley, Ponte Vedra, both of Fla.

[73] Assignee: Ozact, Inc., Lake Worth, Fla.

[21] Appl. No.: 205,999

[22] Filed: Mar. 4, 1994

[51] Int. Cl.6 .................................. C02F 1/78
[52] U.S. Cl. ..................... 210/760; 210/192; 210/195.1; 210/199; 210/257.1; 210/752; 210/765; 210/805; 210/806; 68/13 R; 68/18 F; 68/207
[58] Field of Search ............ 210/760, 192, 195.1, 210/199, 257.1, 266, 805, 806, 765, 752; 68/13 R, 18 F, 207

[56] References Cited
U.S. PATENT DOCUMENTS

| | | |
|---|---|---|
| 3,915,857 | 10/1975 | Olson ..................... 210/257.1 |
| 4,104,164 | 8/1978 | Chelton ................. 210/257.1 |
| 4,351,734 | 9/1982 | Kauffman ................ 210/748 |
| 4,975,199 | 12/1990 | Woster et al. ........... 210/638 |
| 5,097,556 | 3/1992 | Engel et al. ............... 8/158 |
| 5,114,576 | 5/1992 | Ditzler et al. .......... 210/195.1 |
| 5,147,532 | 9/1992 | Leek, Jr. ............... 210/257.1 |
| 5,160,606 | 11/1992 | DeSimone et al. ......... 210/110 |
| 5,181,399 | 1/1993 | Engel et al. ............. 68/13 R |
| 5,241,720 | 9/1993 | Engel et al. ............... 8/158 |
| 5,329,659 | 7/1994 | Reinert, Jr. ............ 210/257.1 |

Primary Examiner—Cynthia L. Nessler
Attorney, Agent, or Firm—Malin, Haley, DiMaggio & Crosby

[57] ABSTRACT

A method and apparatus to restore grey water resulting from a cleaning activity such as laundry using ozone as a cleaning agent in a closed loop system for recycling to preserve water, to reduce system size, and to enhance the efficiency of the cleaning system.

17 Claims, 4 Drawing Sheets

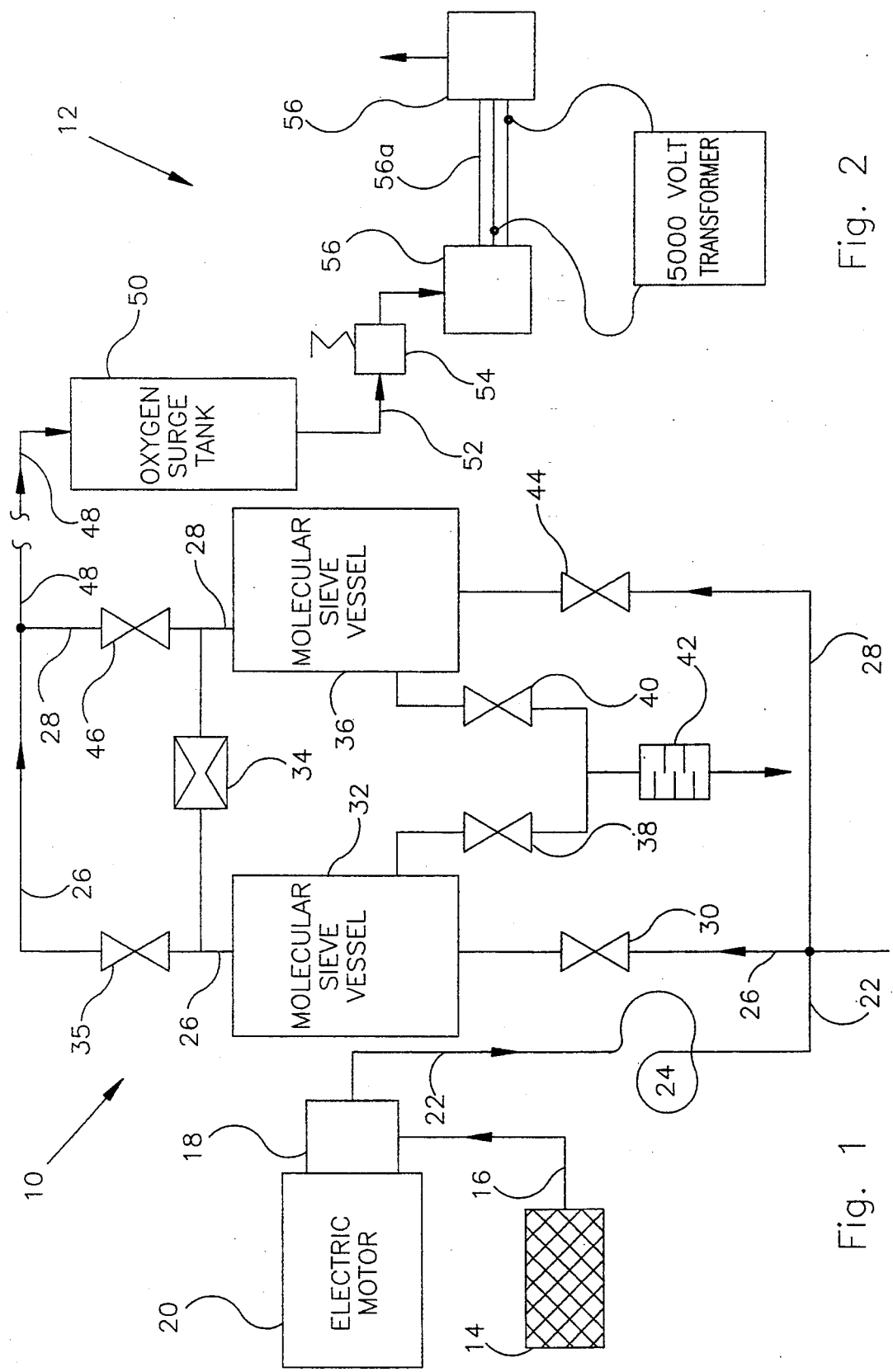

METHOD AND APPARATUS TO RESTORE GREY WATER

BACKGROUND OF THE INVENTION

1. Field of the Invention

The present invention relates generally to a method and apparatus to restore grey water, and more particularly to a method and apparatus to restore grey water resulting from a cleaning activity such as laundry or dishwashing using ozone as a cleaning agent in a compact closed loop system that eliminates tank space, and increases ozone concentration for a more efficient system.

2. Description of the Prior Art

There have been a number of attempts to integrate ozone into the process of recovering grey water for reuse in the cleaning cycle. Ozone is a naturally occurring oxygen compound designated as $O_3$. Typically, ozone is generated when oxygen, $O_2$, is exposed to ultraviolet light or an electrical charge which breaks it down to individual oxygen molecules. As it is well known, ozone is an unstable, powerfully bleaching, toxic (only at very elevated concentrations) oxidizing agent with a pungent irritating odor used to purify and deodorize air, to sterilize water, and as a bleach. Ozone is also used to control airborne organics, molds, fungus, bacteria, and viruses by chemically reacting with them. This makes ozone useful in health care applications as a disinfectant such as in patient and operating rooms, physical therapy rooms, laundry and disposal rooms, food service industries, hotels, restaurants, livestock industries among others.

Prior art systems typically use large ozone generators that utilize ambient air as a feed gas. These systems typically produce inconsistent amounts of ozone which are dependant upon the humidity, temperature, contamination and oxygen content of the available air source. Because of the abundance of nitrogen in ambient air (approximately 75% vs. 20% for $O_2$) nitrous oxide is produced during the process which therefore reduces the number of oxygen atoms available to produce ozone. Generating ozone with nitrogen present produces deleterious nitrous oxides, resulting in nitric acid formation often within both the ozone generator and the air stream expelled by the ozone generator. Such nitric acid in the ozone generator can, because of its conductive properties, reduce the dielectric properties and therefore efficiency, and can severely corrode the equipment with a resultant loss of ozone production and often irreversible damage to the equipment.

U.S. Pat. No. 5,097,556, issued Mar. 24, 1992 to Engel et al. discloses a method for washing laundry without hot water and detergent using a closed loop ozonated wash water system wherein wash water maintained in a storage tank is ozonated by an ozone generator prior to use in a washing machine. Engel et al. processes water in large bulky tanks, uses a plurality of pumps, and manufacturers ozone from ordinary air. The present invention is much less complex and more efficient than the process described in Engel et al. in that it processes water in-stream rather than statically in large bulky tanks, uses far fewer pumps, uses a combination of high purity ozone and oxygen in the chemical portion of the process, uses a water conserving filter design to remove solids, utilizes only one small tank for storage of sufficient water for one cycle of washing, and delivers highly ozonated water to all points of use at all times.

The present invention provides an efficient method and apparatus to restore grey water resulting from a cleaning activity such as laundry. The present invention uses ozone in a closed loop system for recycling to preserve water, to reduce system size, and to enhance the efficiency of the cleaning system.

SUMMARY OF THE INVENTION

The present invention relates to a grey water reclamation system to treat and restore cleaning water in a closed loop, recyclable water system for use with grey water created by a cleaning device such as a laundry washing machine. Water is continually recycled and filtered in a washing machine system using ozone and oxygen as the primary disinfecting, cleaning, and bleaching agent. With this system, it is not necessary to use conventional detergents or soaps which make the water unusable except for an initial cleaning process. The process contemplates recycling the water without adverse affects to the washing process.

In a preferred embodiment, contaminated water from the source of use is collected in a sump or other container for temporary storage. Level controls in the temporary storage detect when there is sufficient water to operate a first stage pump. The first stage pump draws water from the temporary storage and it injects the water into the inlet end of a second stage pump capable of delivering water at an elevated pressure.

The delivery pressure of the second pump (Pump 2) is limited only by an adjustable pressure relieving device or in-line relief valve located downstream of both the second stage pump and a venturi device through which ozone and oxygen are mixed (also dissolved up to the limits of solubility). The adjustable pressure relieving device utilizes a spring loaded poppet or plug which moves from a fully closed, fully seated position as water pressure increases and meters flow relative to the preset spring compressive force. The relative position of the popper or plug determines the resultant water pressure between it and the outlet of the second stage pump.

Because the preset water pressure in this section of the system is set at 90 PSI (gauge) there is insufficient pressure differential between the inlet and outlet of the venturi device. A pressure differential of at least 15% of system pressure should exist in order for a venturi device or eductor to create suction at the gas inlet port as the ozone generator is designed to withstand a maximum of 5 PSI (gauge). A compressor capable of raising the ozone and oxygen gas mixture to a pressure greater than the water pressure is inserted between the ozone generator and the venturi injector. This compressor delivers the gas to a venturi device where a mixture of approximately 7% ozone, 85% oxygen, the remainder being inert, non-reactive gases, is mixed with the water. The use of a venturi injector provides a much smaller bubble size and higher mass transfer (e.g. more dissolved gas) than bubblers in tanks and the ozone/oxygen is far more reactive the smaller the bubble. Also, larger bubbles dispersed in the bottom of a tank rise rapidly to the surface and off gas into the atmosphere. The bubbler method is a far less efficient method of introducing ozone into the water than via venturi where the ozone remains trapped inside a pipe and is thereby forced into direct and continuous contact with the contaminants in the water with no opportunity to escape to the atmosphere.

As the present system uses a compressor to raise gas pressure, it is not necessarily limited to using a venturi. Any method of introducing gas into the water so it is dispersed as fine bubbles is acceptable. Sparging devices such as "stones", ceramic plates, metal or plastic screens etc. which have very small openings (0.5 to 5.0 micrometers) are used. The advantage of venturi vs. sparging devices is usually lower pressure drop and freer flow of gas. However, either can be used as in-line devices.

Reaction dynamics of ozone and oxygen are affected by volume of gas dissolved in the water temperature and contact time. The present system uses pressure to increase the volume of gas dissolved in conjunction with a device (venturi) that is very efficient in mass transfer. The pipe diameter is increased to the largest practical (4"-6" in most laundry applications) and made as long as possible (10' minimum) immediately after the venturi to increase retention time (reaction time) before the first filter.

In prior art systems, ozone is manufactured from ordinary air containing, in the majority, mostly nitrogen. This method provides a product gas from the ozone generator that is a mixture of approximately 1.5% ozone, 18.5% oxygen, 73% nitrogen, 0.5 to 2% nitrous and nitric compounds, the remainder being inert, non-reactive gases. The very low quantities of ozone and oxygen reduce the effectiveness of the process and require multiple large tanks to increase the amount of time for processing to offset the minimal amounts of ozone available. The nitrous oxides and nitric compounds react in the water to produce nitric acid. The nitric acid is corrosive to components and lowers the pH of the water. Washing processes depend on the pH of the water being alkaline (e.g. greater than pH 7.0) either naturally or through the addition of alkaline compounds. Nitric acid reduces the pH and can lower the pH of the water to below pH 7.0 which inhibits the natural detergency of the raw water and also recycled water because acids accumulate in the cycle.

Unlike the prior art where ozone is manufactured from ordinary air, the present invention uses a process whereby ozone is manufactured from high purity oxygen at 85% to 92% purity, with a dew point of negative 100° fahrenheit or greater as feed gas for the ozone generator. This feed gas is manufactured by a pressure swing adsorption device utilizing molecular sieves to separate the oxygen from the other gases found in ambient air. The principle gas removed is nitrogen. This results in a feed gas that does not react in the ozone generator to produce nitrous or nitric compounds. The instant invention utilizes an ozone generator that delivers a product gas stream of approximately 7% ozone, 85% oxygen, the remainder being inert, non-reactive gases. This gas stream is non-acidic and does not directly alter the pH of the process water. As the process involves the rapid oxidation and sanitizing of the water by ozone, and to some degree, by oxygen, the subject invention is considerably more efficient than the prior art processes.

Another means of accelerating reaction is to use a static mixer inserted into the section of pipe immediately downstream of the ozone and oxygen injection point. A static mixer is a series of spiral blades fitted inside pipe with alternating sections counter-rotating flow such that turbulent flow is achieved. The static mixer blends the gases and water very effectively and eliminates laminar flow which separates the gas carrying section of the water from other potentially reactive water-borne chemicals, pathogens, etc.

These contaminants are typically soils, light oils, and bacteria removed from bedding linens, towels and clothing. The ozone and oxygen react with the soils (e.g. oxidation process) and either reduce the organics to their constituent chemicals, typically carbon dioxide, nitrogen and water, or add additional atoms to the inorganics and render them insoluble so they become insoluble flocculants. Bacteria in the water are destroyed by the action of ozone which is similar in effect to that produced by the action of hydrogen peroxide. Ozone and oxygen not initially dissolved in the water and present as bubbles is dissolved into the water as already dissolved gases are consumed in the chemical and sterilizing reactions.

After the oxygen, ozone, and contaminated water have been thoroughly mixed and all reactions have taken place, the water passes through a series of very fine filters where solids (e.g. thread, paper, sand, etc.), dead bacteria and flocculated inorganics are removed. The filters also act as spargers, assuring any larger bubbles of ozone and oxygen that remain are reduced in size as they pass through the small openings in the filters. The cleansed water exits the filter and enters a day tank. This water is generally softer (e.g. fewer dissolved mineral solids) than the raw water supply because the inorganics were oxidized by ozone and removed by the filter. The day tank is a storage tank that acts as a surge device so the system does not starve for water on start up.

During operation, the water in the system is in constant circulation. Water in the day tank is extracted from the tank by a pump and injected into the inlet end of a second venturi device where a second saturating charge of oxygen and ozone is added to the water. This highly oxidant saturated water is then carried via a pipe to the point of use. Where the water is being used for laundry washing, it is used to fill the washers at ambient temperature and with the addition of very little or no chemicals or detergents. Most normally soiled items can be washed without the use of chemicals when washed in highly ozonated water. The ozone, and to some degree, the oxygen, begin the process of oxidizing soils in the fabric during the wash cycle. Ozone is also a powerful bleaching agent. The wash is accomplished by a series of very short cycles as ozone and oxygen are very rapidly consumed in the process. The repeated fillings and emptying of the washers is not wasteful as the water is being recycled, except for that portion removed with the damp clothes at the end of the cycle. The cycle time of washing from beginning to end is actually shorter than for conventional cycle washing. It is being done without the addition of hot water at any time during the cycle which is a very large energy savings.

The washers are serviced by the refill header. The pressure is maintained in this line by a pressure relief device. If the demand (washer fill) for water is less than the volume delivered by the third pump (refill) then excess water is discharged via the relief and flows back through the filters to the day tank. It is this constant flow that assures that water provided to the washers is always charged with the maximum amount of ozone. In prior art devices, the refill line remains quiescent when there is no demand. This means $O_3$ degrades to $O_2$ and is less effective. The present invention does not return refill line discharge water to the system via the sump because ozone gases off the surface and the sump is usually located in the laundry room. Also, it cycles the first two pumps for no reason and increases energy consumption while shortening pump life. The refill system discharge water is already at a pressure sufficient to permit its direct insertion into the process stream ahead of the first filter where it is further processed before returning to the day tank.

Water loss via fabrics transferred from the washing machine to the drying process must be replaced. The need for additional water is determined by the level controls in the day tank. As the third pump runs continuously, the tank low level is critical to assuring a source of water for refilling the washers. When demand exceeds supply, the low level switch in the day tank causes the valve connecting the service water supply to the sump to open and begin filling the sump. The service water supply may not be of a quality suitable for direct introduction into the day tank. By introducing this water via the sump, this water is then processed with ozone and filtered before being made available to the washers. For example, a service water supply containing high amounts of iron would produce brown staining of fabrics were, if not, first processed to oxidize the iron and remove it in the filters.

A typical laundry grey water recycling sequence in accordance with the present invention is as follows. On start-up and minutes prior to any demand for water for the washers, water from the day tank is circulated through the system by pump three after being charged with ozone immediately downstream of that pump. Because there is no demand for water for the washers, the water in the refill line is relieved via a spring loaded relief valve at the far end of the refill line. This flow action purges the line of quiescent water remaining from the previous laundry activity which has lost its ozone charge due to the unstable nature of the gas and time.

The water relieved from the refill line is reintroduced into the closed loop upstream of the first filter. By virtue of the design and operating characteristics of pump 3, its pressure is sufficient to permit it to pass through first and second filters (filters "A" and "B") without any added energy. Reintroducing the refill line water into the closed portion of the system eliminates the off-gassing of ozone that would occur if the refill line water were discharged to the sump. Any materials smaller than the pore size of the filter where they passed would be refiltered at another site on the filter where pore size more readily matches particle size. Also, the refill line water is already at pressure, the energy having already been consumed at pump 3. Emptying the refill line to the sump would add substantially to the energy costs for repressurizing the same water at pumps 1 and 2, and significantly reduce their lives because of excessive cycling. Once the washers are activated and there is demand for water the pressure and flow in the refill line is sufficient to meet demand and only excess water is relieved to the system.

After a cycle of washing grey water from the washer(s) returns via gravity to the sump. Level controls in the sump detect when the sump is full and activates pumps 1 and 2. Pump one is a low pressure pump intended to supercharge the inlet of pump 2. Pump 2 is designed to output high pressure and is limited in its capacity to draw water. Therefore, the inlet of pump 2 must be flooded.

Pump 2 discharges into the inlet of a venturi injector, or other means of injection, where ozone and oxygen are injected at a pressure in excess of the water pressure which is maintained at 90 PSI gauge by the spring loaded pressure relief device immediately before the inlet to filter "A". After the water passes the ozone injection point it flows into a contact section which is considerably larger in diameter than the process piping. This can be either a tank or a section of large diameter pipe. The configuration and positioning of this section is very much dictated by the physical constraints of the area in which system is installed. The objective is to achieve a minimum of 30 seconds ozone contact time before filter "A". For example, at a flow rate of 30 gallons a minute (typical for larger hotel laundries) this would require 15 gallons of capacity. This can be achieved by a 24" diameter by 46" high pressure tank, 138" of 8" pipe, 2 parallel runs or 8' long 6" pipe. Further, this section of contact could be reduced in volume, and size, by the installation of a static mixer. A static mixer is a series of spiral blades fitted inside pipe with alternating sections counter-rotating flow such that shear and high Reynolds numbers are achieved (turbulent flow) much as is achieved by a mechanically rotated mixer.

The purpose of this high pressure section is to raise the volume of ozone that can be introduced into a given volume of water. This aids in dissolution of ozone into the water, and subsequent dissolution as ozone already dissolved is consumed in reaction. It also more readily forces ozone into the structure of bacteria, virus, fungus and molds transported in the water.

After the initial contact section, the water enters the first filter at a pressure determined by the pressure required to transport the water through filters "A" and "B", and intermediate plumbing and valves. The filter media has a pore size not exceeding 5 micrometers. This pore size is small enough to retain bacteria, precipitated and flocculated soils and chemicals, and lint from fabrics. This results in a highly clarified water which in most instances exceeds the quality of the raw water supply. Additionally, the filter media pore size sparges any remaining undissolved ozone and oxygen to a bubble size equal to or smaller than the filter media pore size.

Filters "A" and "B" function as both series and parallel devices. In the normal operating mode (series) water passes through both "A" and "B" which contain filter media of equal pore size. This assures that filterable solids resulting from a chemical reaction that was incomplete before passing filter "A" would be retained at filter "B". In the backwash mode the filters function as parallel devices. When the sensors signal that filter "A" is full, water bypasses filter "A" during the 13–15 seconds of backwash and is filtered at "B". When the sensors signal that filter "B" is full, water bypasses filter "B" during the 13–15 seconds of backwash, but continues to be filtered at "A". A microprocessor control assures that filters "A" and "B" cannot be backwashed simultaneously. This system assures a very high degree of filtration during most of the operating cycle (series) and assured filtration during the brief periods of backwash (parallel).

After filtration the water is delivered to the day tank which provides sufficient water for one cycle of laundry operation on start-up and functions as a surge device in conjunction with the sump to eliminate shortage or overage of water in the closed loop. Excess ozone and oxygen remaining in the water may exit the water at the surface and is vented. At the day tank pump 3 pressurizes the refill line.

When the level controls in the sump and in the day tank sense a deficiency in the closed loop system water volume, the microprocessor opens the valve at the service water line and refills the sump. Make-up water is introduced to sump as opposed to the day tank for one very important reason: water quality. Incoming water quality can be detrimental to the laundry process due to inorganic or organic contact. For example, high levels of iron in the water can result in a brown staining of fabrics. Ozone, as an aggressive oxidizer, precipitates iron and other metallic constituents which are removed by the filters before the water is introduced to the wash cycle. Odors in the water from dissolved hydrogen sulphide gas or other organic sources are eliminated also.

It is an object of this invention to provide a grey water reclamation system wherein high purity oxygen is used as a feed gas resulting in higher levels of ozone.

Another object of this invention is to provide a method and apparatus to recover and treat grey water that eliminates nitrous and nitric acid compounds from the gases used in the process, thereby eliminating the acidification of the water and enhancing the process.

Still another object of this invention is to provide a method and apparatus for recovering and treating grey water using an in stream, closed loop process, thereby accelerating the processing of the water, and eliminating the off gassing experienced with bubblers in tanks, thereby eliminating the need for multiple tanks and pumps.

Still another object of this invention is to provide a method and apparatus for recovering and treating grey water using a venturi, a static mixer, and fine filtration as agents of improved mass transfer, thereby making the subject process more efficient than the prior art.

And yet another object of this invention is to provide a method and apparatus for recovering and treating grey water using a constantly recirculating system with a venturi device immediately before the point of use, thereby assuring a very high amount of ozone available at the point of use at all times.

And yet another object of this invention is to provide a method and apparatus for recovering and treating grey water that is far more compact than prior art devices.

In accordance with these and other objects which will become apparent hereinafter, the instant invention will now be described with particular reference to the accompanying drawings.

BRIEF DESCRIPTION OF THE DRAWINGS

FIG. 1 shows a schematic drawing of the low humidity oxygen supply used in the present invention.

FIG. 2 shows a schematic diagram of the ozone generator used in the present invention.

FIG. 4b shows a schematic drawing of another portion of the instant invention, wherein FIGS. 4a and 4b are connected together.

DESCRIPTION OF THE PREFERRED EMBODIMENTS

Figure 4A:
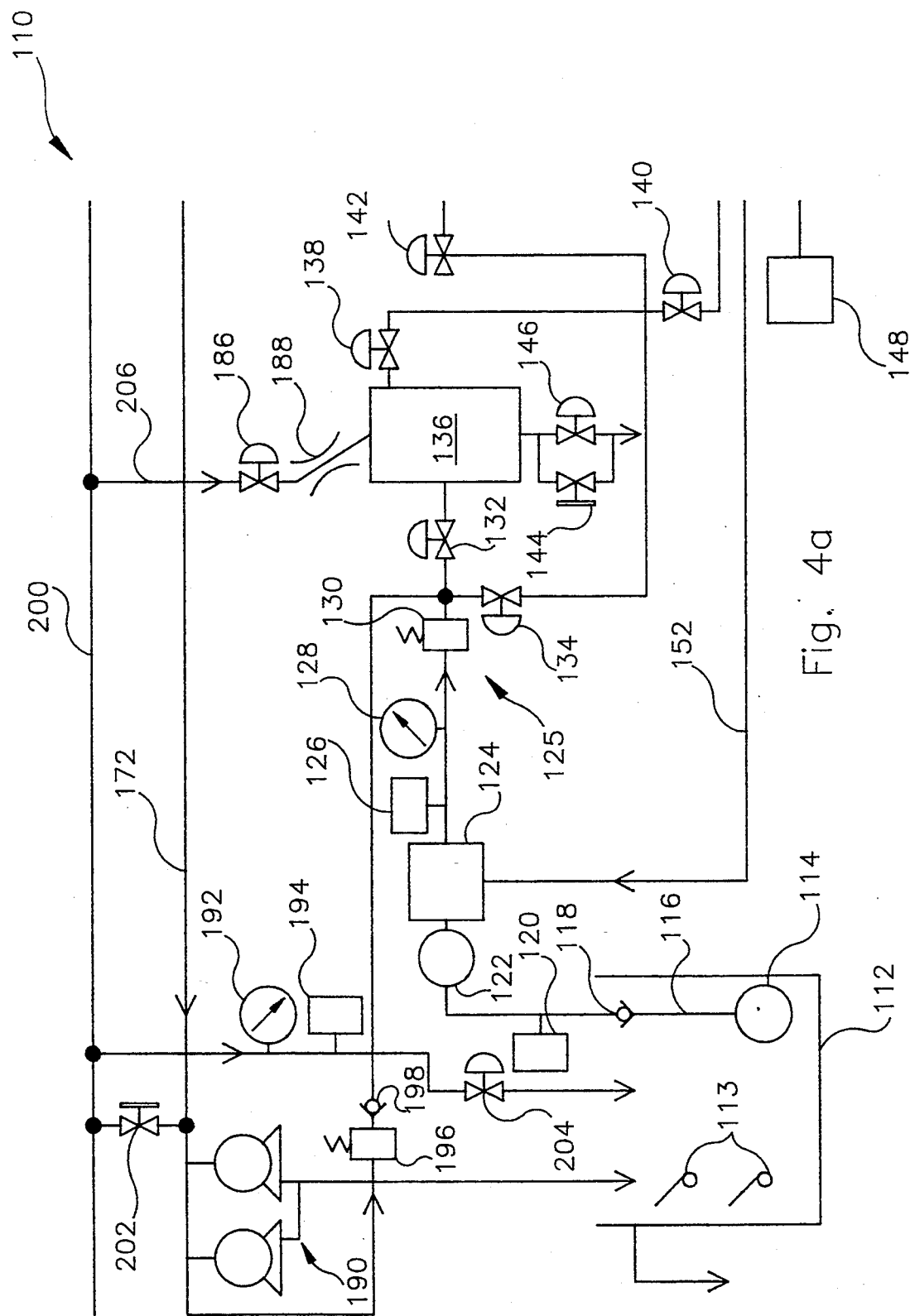
FIG. 4a shows a schematic drawing of a portion of the instant invention.
Figure 4B:
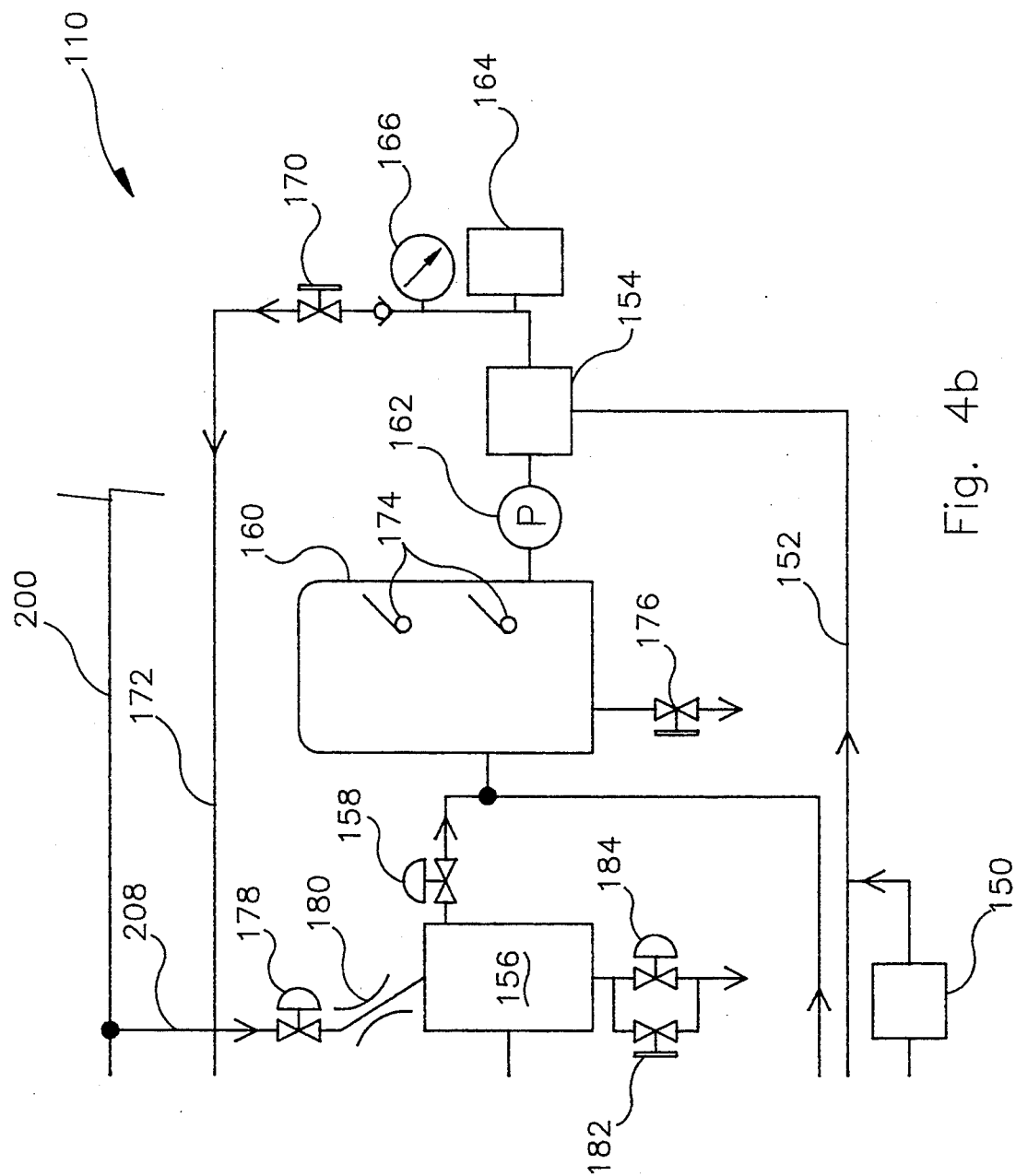

Referring now to the drawings and in particular FIGS. 4a and 4b, the present invention is shown generally at 110. With respect to the operation of the device, a typical laundry grey water recycling sequence in accordance with the present invention is as follows. On start-up and minutes prior to any demand for water for the washer(s) 190, water from the day tank 160 is circulated through the system by pump 162 after being charged with ozone immediately downstream of that pump. Because there is no demand for water for the washer(s) 190, the water in the refill line 172 is relieved via a spring loaded relief valve 196 at the far end of the refill line 172. This flow action purges the refill line 172 of quiescent water remaining from the previous laundry activity which has lost its ozone charge due to the unstable nature of the gas and time.

The water relieved from the refill line 172 is reintroduced into the closed loop upstream of the first filter 136. By virtue of the design and operating characteristics of pump 162, its pressure is sufficient to permit it to pass through first filter 136 and second filter 156 without any added energy. Reintroducing the refill line water into the closed portion of the system eliminates the off-gassing of ozone that would occur if the refill line water were discharged to the sump 112. Any materials smaller than the pore size of the filter where they passed would be refiltered at another site on the filter where pore size more readily matches particle size. Also, the refill line water is already at pressure, the energy having already been consumed at pump 162. Emptying the refill line 172 to the sump 112 would add substantially to the energy costs for repressurizing the same water at pumps 114 and 122, and significantly reduce their lives because of excessive cycling. Once the washer(s) 190 is/are activated and there is demand for water, the pressure and flow in the refill line 172 is sufficient to meet demand and only excess water is relieved to the system.

After a cycle of washing, grey water from the washer(s) 190 returns via gravity to the sump 112. Level controls 113 in the sump 112 detect when the sump 112 is full and activate pumps 114 and 122. Pump 114 is a low pressure pump intended to supercharge the inlet of pump 122 via line 116, check valve 118, and pressure switch 120. Pump 122 is designed to output high pressure and is limited in its capacity to draw water. Therefore, the inlet of pump 122 must be flooded.

Pump 122 discharges into the inlet of a gas producing means 124, which in the preferred embodiment is a venturi injector, where ozone and oxygen are injected from an ozone source at a pressure in excess of the water pressure which is maintained at 90 PSI gauge by the spring loaded pressure relief device 130 immediately before the inlet to filter 136. It is important to note that any means of introducing gas into the water so that it is dispersed as fine bubbles is acceptable. For example, sparging devices such as stones, ceramic plates, metal or plastic screens, etc. which have very small openings can be used. The ozone source comprises a high purity oxygen source 148 connected to an ozone generator 150, wherein the ozone source is connected via ozone source line 152 to gas producing means 124. An illustrative example of an ozone source will be discussed in greater detail hereinafter.

After the water passes the first ozone injection point, it flows into a contact section 125 which is considerably larger in diameter than the process piping. This can be either a tank or a section of large diameter pipe. The configuration and positioning of this section is very much dictated by the physical constraints of the area in which system is installed. The objective is to achieve a minimum of 30 seconds ozone contact time before filter 136. For example, at a flow rate of 30 gallons a minute (typical for larger hotel laundries) this would require 15 gallons of capacity. This can be achieved by a 24" diameter by 46" high pressure tank, 138" of 8" pipe, two parallel runs of 8' long 6" pipe. Further, this section of contact 125 could be reduced in volume, and size, by the installation of a static mixer. A static mixer is a series of spiral blades fitted inside pipe with alternating sections counter-rotating flow such that shear and high Reynolds numbers are achieved (turbulent flow) much as is achieved by a mechanically rotated mixer.

The purpose of this high pressure section is to raise the volume of ozone that can be introduced into a given volume of water. This aids in dissolution of ozone into the water, and subsequent dissolution as ozone already dissolved is consumed in reaction. It also more readily forces ozone into the structure of bacteria, virus, fungus and molds transported in the water.

After the initial contact section 125, the water enters the first filter 136 at a pressure determined by the pressure required to transport the water through filters 136 and 156, and intermediate plumbing and valves, e.g. pressure switch 126, pressure gauge 128, relief valve 130, and pneumatic valve 132. The filter media has a pore size not exceeding 5 micrometers. This pore size is small enough to retain bacteria, precipitated and flocculated soils and chemicals, and lint from fabrics. This results in a highly clarified water which in most instances exceeds the quality of the raw water supply. Additionally, the filter media pore size sparges any remaining undissolved ozone and oxygen to a bubble size equal to or smaller than the filter media pore size.

Filters 136 and 156 function as both series and parallel devices. In the normal operating mode (series) water passes through both filter 136 and filter 156, each of which contain filter media of equal pore size. This assures that filterable solids resulting from a chemical reaction that was incomplete before passing filter 136 would be retained at filter 156.

In the backwash mode, water enters filters 136 and 156 from service water line 200 via backwash supply lines 206 and 208, respectively. Backwash water enters filter 136 after passing through pneumatic valve 186 and air injector 188. Backwash water exits filter 136 through valves 144 and 146 which are each connected to a drain. Similarly, backwash water enters filter 156 after passing through pneumatic valve 178 and air injector 180, and exits filter 156 after passing through valves 182 and 184. In the backwash mode, filters 136 and 156 function as parallel devices. When sensors signal that filter 136 is full, water bypasses filter 136 during the 13-15 seconds of backwash and is filtered at filter 156. When sensors signal that filter 156 is full, water bypasses filter 156 during the 13-15 seconds of backwash, but continues to be filtered at filter 136. A microprocessor control assures that filters 136 and 156 cannot be backwashed simultaneously. This system assures a very high degree of filtration during most of the operating cycle (series) and assured filtration during the brief periods of backwash (parallel).

After filtration by filter 136, the water exits filter 136, passes through pneumatic valves 138 and 142, and enters filter 156. After being filtered by filter 156, the water is delivered through pneumatic valve 158 and into day tank 160 which provides sufficient water for one cycle of laundry operation on start-up and functions as a surge device in conjunction with the sump 112 to eliminate shortage or overage of water in the closed loop.

During operation, the water in the system is in constant circulation. Water in the day tank 160 is extracted from the tank 160 by pump 162 and injected into the inlet end of a second gas introducing means 154, which in the preferred embodiment is a venturi injector, where a second saturating charge of oxygen and ozone is added to the water, where ozone and oxygen are injected from the aforementioned ozone source, wherein the ozone source is connected via ozone source line 152 to second gas producing means 154. This highly oxidant saturated water and is then carried via line 172 to the point of use (e.g. washer(s) 190). Where the water is being used for laundry washing, it is used to fill the washers at ambient temperature and with the addition of very little chemicals or detergents. Excess ozone and oxygen remaining in the water may exit the water at the surface and is vented. At the day tank 160, pump 162 pressurizes the refill line 172, which is maintained at the proper pressure by valves and intermediate plumbing (e.g. pressure switch 164, pressure gauge 166, check valve 168, valve 170, and relief valve 196).

When the level controls 113 in the sump and the level controls 174 in the day tank 160 sense a deficiency in the closed loop system water volume, the microprocessor opens valve 204 at the service water line and refills the sump 112. Manual valve 202 serves as a back-up. Make-up water is introduced to sump 112 as opposed to the day tank 160 for one very important reason: water quality. Incoming water quality can be detrimental to the laundry process due to inorganic or organic contact.

The washer(s) is/are serviced by the refill header 172. The pressure is maintained in this line by pressure relief device 196. If the demand (washer fill) for water is less than the volume delivered by the pump 162 (refill), then excess water is discharged via the relief valve 196, flows through check valve 198 and flows back through the filters 136 and 156 to the day tank 160. It is this constant flow that assures that water provided to the washers is always charged with the maximum amount of ozone. In prior art devices, the refill line remains quiescent when there is no demand. This means $O_3$ degrades to $O_2$ and is less effective. The present invention does not return refill line discharge water to the system via the sump because ozone gases off the surface and the sump is usually located in the laundry room. Also, it cycles the first two pumps for no reason and increases energy consumption while shortening pump life. The refill system discharge water is already at a pressure sufficient to permit its direct insertion into the process stream ahead of the first filter where it is further processed before returning to the day tank.

Water loss via fabrics transferred from the washing machine 190 to the drying process must be replaced. The need for additional water is determined by the level controls 174 in the day tank. As pump 162 runs continuously, the tank low level is critical to assuring a source of water for refilling the washers 190. When demand exceeds supply, the low level switch in the day tank causes the valve 204 connecting the service water supply 200 to the sump 112 to open and begins filling the sump 112. The service water supply may not be of a quality suitable for direct introduction into the day tank 160. By introducing this water via the sump 112, this water is then processed with ozone and filtered before being made available to the washers 190.

An illustrative example of an integrated high purity oxygen supply and ozone generator may be found in my co-pending U.S. patent application Ser. No. 08/172,735.

The integrated high purity oxygen supply and ozone generator described in my co-pending U.S. patent application Ser. No. 08/172,735 provides an efficient, consistent, continuous source of ozone from a portable ozone generator that can be used with any available conventional electrical power source including ordinary 120 volt household AC current. As an example, in one application the device weights 34 lbs. and produces two grams pure ozone per hour. Lighter and heavier units can be made having proportionately less and more ozone outputs.

The high purity oxygen supply system comprises an electrically driven air compressor or multiples thereof and a molecular sieve system connected to the output of the air compressor that concentrates available ambient air 20% oxygen up to an 85% to 92% concentration while extracting moisture and nitrogen.

The air compressor is used to provide ambient air under pressure that is forced into the molecular sieve system that traps water and nitrogen to allow concentration of the normal 20% oxygen in the ambient air up to a 85% to 90% concentration. By reducing the effective dew point of the delivered feed gas to the ozone generator to a greater than a minus 100° F. and eliminating nitrogen, the production of the nitric oxides and nitric acids is eliminated. The air compressor and ozone generator use ordinary 120 volt household current in a single easily portable cabinet to produce a continuous supply of ozone.

Therefore, the ozone generation system is a compact, portable and totally self-contained device that can produce consistent and continuous amounts of ozone regardless of the humidity levels or temperature of ambient air. The ozone generator has an indefinite operating life due to lack of nitric oxide that would cause corrosion. The quality of the ozone produced is free of nitric oxide and is thus better suited to the use for which it was intended. An alternate embodiment can be operated on 12 or 24 volt DC.

An illustrative example of an ozone generation system which may be used with the present invention is shown generally in FIGS. 1 and 2 comprised of a source of dry, pure oxygen having a source 10 (shown in FIG. 1) and an ozone generator supplying continuous ozone generally at 12 (in FIG. 2) which is connected to the dry oxygen source.

With respect to the operation of the ozone generation system, ambient air, regardless of humidity, is drawn in through an air intake filter and resonator 14 connected to an air conduit 16, coupled to the inlet side of air compressor 18 that is powered from a rotational source of energy from electric motor 20 that can be attached to a conventional 120-volt AC outlet. The air is compressed in compressor 18 from approximately 13 psi to approximately 26 psi and expelled through conduit 22. The air is transferred through an after-cooler such as a multi-coil aluminum tube with a fan forcing air over it to reduce the temperature of the air under pressure and increase the gas density in conduit 22. The outlet of conduit 22 is located at a position 22a.

From this point forward, there are two separate, individually actuated molecular sieve vessels 32 and 36. Only one molecular sieve vessel will be utilized at a time because of how rapidly the vessels accumulate moisture and nitrogen. A plurality of valves allow the continuous flow of air under pressure from line 22 to move into either molecular sieve vessel 32 or to molecular sieve vessel 36 in a cyclical, periodic action. Thus, when the molecular sieve vessel is not in use, it is being purged by a backflow through an exhaust muffler 42. When the molecular sieve vessel is on line, it is trapping moisture and nitrogen particles which thoroughly dries out air under pressure, converting it to a very pure oxygen source which ultimately ends up in line 48 from either molecular sieve vessel through line 26 or through line 28.

In a typical sequence with molecular sieve vessel 32 on line and molecular sieve vessel 36 off line, valves 30 and 34 are open with a slight overflow through bidirectional fixed orifice 34 which moves backward into molecular sieve vessel 36 with valve 40 being open. Excess gases can be transferred out of exhaust muffler 42. In this sequence, valve 44 is closed, valve 38 is closed to contain incoming air in molecular sieve vessel 32, and valve 46 is closed. Thus, high pressure air from conduit 22 will go through valve 30 through the molecular sieve vessel 32 through valve 34 into conduit 26, where it is transferred into conduit 28. At this point, there will be very pure oxygen that has a dew point of $-100°$ F., which is ideal for ozone generation. Also, a slight amount of air under pressure goes through the fixed orifice 34 and into molecular sieve vessel 36 and through valve 40 to the exhaust muffler 42, thus disposing of excess humidity and nitrogen previously trapped in molecular sieve vessel 36.

Because the molecular sieve vessels are filled rapidly with moisture or nitrogen (between 6–14 seconds), all of the valve sequences discussed must be cycled rapidly and repeatedly to allow cleansing out of each molecular sieve vessel when it is not in use.

Therefore, once molecular sieve vessel 32 is filled with humidity and nitrogen, all the valves will be reversed, so that valve 44 will be open, valve 46 will be open, valves 30 and 34 will be closed, valve 40 will be closed, and valve 38 is open. Therefore, air under pressure from conduit 22 will commence at point 22a and be transferred through valve 44 through the molecular sieve vessel 36, where the humidity and nitrogen are removed, onward through valve 46 into conduit 28, where the air is received into the outlet conduit 48 as pure, dry oxygen, having a dew point of $-100°$ F. Also, excess air pressure will go through bidirectional fixed orifice 34 back into molecular sieve vessel 32, out through valve 38 and the exhaust muffler 42, which essentially purges molecular sieve vessel 32. The valves are periodically cycled automatically by a control unit attached to each valve.

The molecular sieve vessels 32 and 36 are filled with small beads, typically 1.5–4.5 millimeter diameter of an alkali aluminosilicate with an effective pore opening of 5 angstroms. Nitrogen, water vapor, and some carbon dioxide is absorbed into the molecular sieve material to achieve a very dry, concentrated stream of oxygen out of the top of each vessel. The exit gas will be in the range of 85 to 92% pure oxygen at a dew point of $-100°$ F. or greater. A small amount of the exiting oxygen from each molecular sieve vessel 32 or 36 passes over the bidirectional fixed orifice and flows into the opposite vessel because the pressure drop across the orifice 34 is lower then the combined pressure drop of the remaining devices downstream of the opposite vessel, and valves 38 or 40 are open to atmosphere. Thus, the small amount of oxygen combined with the depressurization of each vessel, the oxygen remaining in the upper volume of the vessel and the exit tube displaces the gases and moisture absorbed into the molecular sieve material, as well as any free air. This displaced gas exits to atmosphere through either an open valve 38 or 40. The exhaust muffler is attached to the venting tubes from each vessel 32 and 36 to suppress noise created when the pressure within a vessel is suddenly relieved by the opening of a valve.

Because of the limited size of the vessel and the saturation time of the molecular sieve, materials are saturated. All the valves are controlled by a timer that energize and de-energize all the valves which are either (by spring action) normally open or normally closed in the de-energized state. The energized solenoid operator can overcome spring force to move the valve to the opposite condition when energized. For cost and space reduction, check valves can be used in place of valves 30 and 36, and a single operated solenoid with a multi-port valve, which has all the functions of the four remaining single solenoid valves, can be combined.

Referring now to FIG. 2, the purified oxygen, which is dry, is transferred under pressure through conduit 48 into an oxygen surge tank 50. This tank can accommodate variations in pressure and flow due to changes in the valve positions and gas absorption rates. The tank also maintains a charge of oxygen, whenever the system is shut down, so that oxygen is immediately available to the generator upon startup. FIG. 2 shows the oxygen generator system 12 that also includes a pressure reducing device 54 connected to the output of oxygen surge tank 50 through conduit 52, which itself has an outlet going to the actual ozone generator 56. Ozone generator 56 includes a 5,000-volt transformer 58 and a flow area 56a where the pure oxygen is converted into ozone due to the 5,000-volt alternating current field. The resulting ozone is transported by residual oxygen to the outlet exhaust manifold for its subsequent use. The ozone can either be vented into a forced air fan for dilution and delivery to the point of use or into a tube fitting in the portable cabinet wall for delivery as undiluted ozone.

Figures 3, 4:
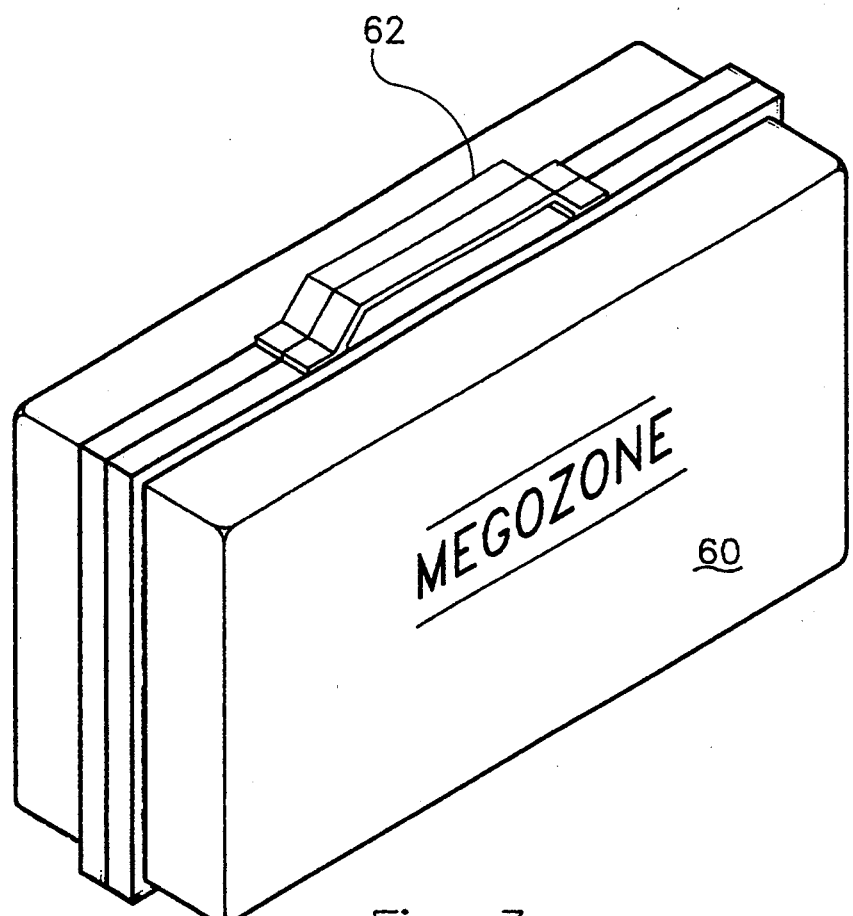
FIG. 3 shows a portable housing used in the invention.
FIG. 4 is a composite showing the relationship between FIGS. 4a and 4b.

FIG. 3 shows a rigid metal portable housing 60 that contains the device described in FIGS. 1 and 2 having a carrying handle 62.

The system shown in FIGS. 1 and 2 is mounted in a single, rigid cabinet with a cord used for providing power to a typical 120-volt AC outlet. By using the aforementioned portable compact unit, a 72 lb. device can produce approximately 6 grams per hour of pure ozone. Other small units at a lower output are also available.

However, it is contemplated that any source of high purity oxygen connected to an ozone generator capable of satisfying the foregoing purity requirements can be integrated into the instant invention.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A closed loop water and cleaning agent supply system to supply water and a cleaning agent to a cleaning device, said system providing restoration and regeneration to grey water output from the cleaning device for recycle and reuse of the grey water, comprising:

a grey water supply conduit in fluid communication with a grey water source, said grey water supply conduit having an inlet and an outlet;

a grey water sump in fluid communication with the outlet of the grey water supply conduit for receiving and storing grey water;

first means for introducing gas into the grey water, said first means for introducing gas having a first inlet, a second inlet, and an outlet;

first pump means for transferring grey water from said sump to the first inlet of said first means for introducing gas;

an ozone source;

means connecting said ozone source to said second inlet of said first means for introducing gas, whereby ozone is introduced into grey water passing through said first means for introducing gas;

a contact section defining means for raising the volume of ozone that can be introduced into a given volume of water, said contact section connected to and downstream of said first means for introducing gas;

a first particulate filter means for filtration of particulate matter, said first particulate filter means having at least one inlet and at least one outlet, at least one first particulate filter means inlet connected to and downstream of the contact section, said first particulate filter means thereby receiving ozonated grey water;

a second particulate filter means for filtration of particulate matter, said second particulate filter means having at least one inlet and at least one outlet, at least one second particulate filter means inlet connected to and downstream of the contact section, said second particulate filter means thereby receiving ozonated grey water;

a liquid receiving tank having an inlet connected to at least one outlet of and downstream of each of said first and second particulate filter means, said liquid receiving tank for holding a predetermined supply of ozonated filtered water for use in cleaning, said liquid receiving tank having at least one outlet, at least one liquid receiving tank outlet connected to a cleaning device that utilizes water and ozone as a cleaning agent for cleaning; and means for reintroducing the water held in said liquid receiving tank upstream of said first particulate filter means;

whereby water being discharged from a cleaning device is connected to the inlet of the grey water supply conduit, forming a closed loop system, allowing the water and cleaning agent to be recycled continuously.

2. The system as described in claim 1, wherein said ozone source comprises a high purity oxygen source connected to an ozone generator.

3. The system as described in claim 1, wherein said ozone source produces a product gas that is a mixture of approximately seven percent (7%) ozone and eighty-five percent (85%) oxygen.

4. The system as described in claim 2, wherein said high purity oxygen source produces oxygen that is at least eighty-five percent (85%) pure.

5. The system as described in claim 1, further comprising a second means for introducing gas into the grey water, said second means for introducing gas having a first inlet, a second inlet, and an outlet, said second means for introducing gas connected between said liquid receiving tank and said cleaning device.

6. The system as described in claim 5, further comprising second pump means for transferring water from said liquid receiving tank to the first inlet of said second means for introducing gas.

7. The system as described in claim 6, wherein said ozone source is connected to the second inlet of said second means for introducing gas, whereby ozone is introduced into the water passing through said second means for introducing gas, the outlet of said second means for introducing gas being connected to said cleaning device.

8. The system as described in claim 1, wherein said first means for introducing gas and said second means for introducing gas is a venturi injector.

9. The system as described in claim 1, wherein said first means for introducing gas and said second means for introducing gas is a sparging device.

10. The system as described in claim 1, further including means for replenishing the water lost from the system due to operation of said cleaning device.

11. A closed loop water and cleaning agent supply system to supply water and a cleaning agent to a cleaning device, said system providing restoration and regeneration to grey water output from the cleaning device for recycle and reuse of the grey water, comprising:
a grey water supply conduit in fluid communication with a grey water source, said grey water supply conduit having an inlet and an outlet;
a grey water sump in fluid communication with the outlet of the grey water supply conduit for receiving and storing grey water;
first means for introducing gas into the grey water, said first means for introducing gas having a first inlet, a second inlet, and an outlet;
first pump means for transferring grey water from said sump to the first inlet of said first means for introducing gas;
an ozone source;
means connecting said ozone source to said second inlet of said first means for introducing gas, whereby ozone is introduced into grey water passing through said first means for introducing gas;
a contact section defining means for raising the volume of ozone that can be introduced into a given volume of water, said contact section connected to and downstream of said first means for introducing gas;
a first particulate filter means for filtration of particulate matter, said first particulate filter means having at least one inlet and at least one outlet, at least one first particulate filter means inlet connected to and downstream of the contact section, said first particulate filter means thereby receiving ozonated grey water;
a second particulate filter means for filtration of particulate matter, said second particulate filter means having at least one inlet and at least one outlet, at least one second particulate filter means inlet connected to and downstream of the contact section, said second particulate filter means thereby receiving ozonated grey water;
a liquid receiving tank having an inlet connected to at least one outlet of and downstream of each of said first and second particulate filter means, said liquid receiving tank for holding a predetermined supply of ozonated filtered water for use in cleaning, said liquid receiving tank having at least one outlet, at least one liquid receiving tank outlet connected to a cleaning device that utilizes water and ozone as a cleaning agent for cleaning;
a second means for introducing gas into the grey water, said second means for introducing gas having a first inlet, a second inlet, and an outlet, said second means for introducing gas connected between said liquid receiving tank and said cleaning device;
second pump means for transferring water from said liquid receiving tank to the first inlet of said second means for introducing gas, said second pump means further reintroducing the water held in said liquid receiving tank upstream of said first particulate filter means;
said ozone source being connected to the second inlet of said second means for introducing gas, whereby ozone is introduced into the water passing through said second means for introducing gas, the outlet of said second means for introducing gas being connected to said cleaning device; and
means for replenishing the water lost from the system due to operation of said cleaning device;
whereby water being discharged from a cleaning device is connected to the inlet of the grey water supply conduit, forming a closed loop system, allowing the water and cleaning agent to be recycled continuously.

12. A method of restoring grey water resulting from a cleaning activity using a closed loop system comprising the steps of:
maintaining a supply of grey water in a first storage means;
transferring said grey water from said first storage means to a contact section for raising the volume of ozone that can be introduced into a given volume of water, wherein said transferring step includes the step of introducing gas into the grey water via a first means for introducing gas;
ozonating said grey water as it passes through said first means for introducing gas;
filtering said ozonated grey water;
delivering said filtered ozonated grey water to a liquid receiving tank;
conveying said ozonated grey water from said liquid receiving tank to a cleaning device, said cleaning device being a source of grey water, wherein said step of conveying includes the steps of again introducing gas into the ozonated grey water via a second means for introducing gas and again ozonating the already ozonated grey water; and
recirculating the water from said cleaning device into the first storage means after said cleaning device has ended a cleaning cycle.

13. The method of claim 12, wherein said ozonating step is further defined by providing a high purity oxygen source connected to an ozone generator.

14. The method of claim 13, wherein said ozonating step produces a product gas that is a mixture of approximately seven percent (7%) ozone and eighty-five percent (85%) oxygen.

15. The method of claim 13, wherein the high purity oxygen source produces oxygen that is at least eighty-five (85%) percent pure.

16. The method of claim 12, further including the step of replenishing the water lost from the system due to operation of said cleaning device.

17. The method of claim 12, wherein said grey water is maintained at ambient temperature.

* * * * *